United States Patent Office 3,352,788
Patented Nov. 14, 1967

3,352,788
ACTIVATED CARBON COMPOSITIONS
John R. Conlisk, Harford, Md., assignor to Atlas Chemical Industries, Inc., Wilmington, Del., a corporation of Delaware
No Drawing. Filed Aug. 26, 1965, Ser. No. 482,901
8 Claims. (Cl. 252—161)

This application is a continuation-in-part of copending application Serial No. 226,171, filed Sept. 25, 1962, now abandoned, which is in turn a continuation-in-part of application Serial No. 119,807, filed June 27, 1961, now abandoned, which in turn is a continuation-in-part of application Serial No. 53,600, filed Sept. 2, 1960, now abandoned.

This invention relates to activated carbon compositions which consist essentially of activated carbon and a liquid material having a function in the system to be treated with the activated carbon. In particular, this invention relates to activated carbon powder granulated with a temporary, liquid binder which renders the carbon powder substantially dust-free.

Because of its adsorbent properties, activated carbon is effective in removing materials from process solutions such as dry cleaning solutions, electroplating solutions, sugar solutions, animal and vegetable oils and fats, petroleum fractions, etc. However, in using activated carbon to purify process solutions, several problems are encountered. It is often difficult to get the activated carbon dispersed in the solution, for it has a tendency to float on top of the solution. Closely related to this difficulty of mixing and dispersing activated carbon is the problem of achieving proper contact between the carbon and the solution to be treated. Perhaps the most troublesome problem related to the use of powdered activated carbon is that of carbon dust. Carbon dust makes it difficult to handle the powdered activated carbon, and it causes much of the carbon to be lost into the surrounding atmosphere, which is wasteful and inefficient.

It is an object of the present invention to provide an improved activated carbon composition which is readily dispersed in process solutions to be treated with the activated carbon.

Another object is the provision of granulated, substantially dust-free activated carbon compositions containing a relatively high proportion of a temporary, liquid binder.

Another object of the invention is to overcome the problem of carbon dust by providing a granulated activated carbon composition containing a temporary, liquid binder.

An additional object is to provide an activated carbon composition granulated with a temporary, liquid binder, which binder is of utility in the solution being treated with the activated carbon.

A further object is to provide a granulated activated carbon composition which is as effective as an adsorbent as the powdered activated carbon from which it is made.

A still further object is to provide an improved method for reconditioning spent dry cleaning solutions.

The above and other objects will become apparent to those skilled in the art during the following description of this invention.

In accordance with the invention, it has been discovered that activated carbon powder can be granulated with a temporary, liquid binder having a concurrent function along with the activated carbon in the solution to be treated. Through the use of a suitable liquid binder, the activated carbon powder is formed into small particles or granules which are substantially dust-free.

One of the essential features of this invention is that the liquid binder have utility in the solution being treated with the activated carbon composition. Accordingly, a relatively high proportion of binder is used when granulating the activated carbon powder. The liquid binder is a temporary binder and should be soluble in the solution being treated in order that it can perform its own function in the solution being treated and not impair the effectiveness of the activated carbon.

It has been discovered that if the liquid binder is soluble in a solution being treated with activated carbon, the carbon which has been granulated with a temporary, liquid binder will return to its former pulverized form and the effective particle size of the activated carbon will be unimpaired. Therefore, the granulated activated carbon is substantially dust-free, which makes it easier to handle, and is substantially as efficient in the process solution being treated as the powdered carbon from which it is made. Additional advantages are that the temporary binder functions concurrently with the activated carbon in the solution being treated and the temporary binder, which is preferable a viscous liquid, is in a more easily handled form.

In some instances, there may be no problem of carbon dusting but the activated carbon may be used as an effective carrier for a liquid material which is to be incorporated into the system to be treated with the activated carbon. For example, a granular activated carbon, which may have a particle size ranging from about 4 mesh to about 60 mesh, may be used as a carrier for a liquid material in which case the liquid does not have to function as a binder for there is no problem of carbon dusting.

A typical example demonstrating the application of the principles of this invention is to be found in the treatment of dry cleaning solutions. In standard dry cleaning processes, a solvent-detergent solution is brought into contact with materials to be cleaned, and during the cleaning operation, the solution becomes contaminated with various impurities and must be purified prior to reuse. Furthermore, detergent is used up during the cleaning process and must be replenished.

Therefore, in accordance with one embodiment of this invention, an activated carbon powder which has been granulated with a dry cleaning detergent is added to the used dry cleaning solvent-detergent solution. In this application, the granulated activated carbon is substantially dust-free for ease of handling and has the additional advantage of wetting instantly upon contact with the dry cleaning solution which facilitates the dispersion of the activated carbon in the solution. Upon adding the granulated carbon to the solution, the detergent binder is dissolved in the dry cleaning solution, thereby replacing the detergent which was used up during the cleaning operation. Furthermore, the granulated carbon, upon releasing the detergent binder to the solvent, regains its effective particle size as an adsorbent and is as efficient for decolorizing the used solution (on a carbon weight basis) as the activated carbon from which it is made.

The advantages achieved using this invention in reconditioning dry cleaning solutions are obvious. The granulated activated carbon is substantially dust-free. Unlike permanent binders, which decrease activated carbon activity to some extent, the temporary binders of this invention leave the carbon free to do its primary job of solvent decolorization. Furthermore, the binder can be used in higher proportions because it also functions in reconditioning the spent dry cleaning solution, for this is an easy and convenient way to replenish the dry cleaning detergent. An additional advantage is that many dry cleaning detergents are viscous liquids which are difficult to handle and measure, but when combined with activated carbon they are readily handled and measured. A further advantage is that the detergent aids in dispersing the activated carbon in the dry cleaning solution.

In some instances, it may be desirable to treat spent dry cleaning solutions with activated carbon in the form of permanent granules to perform the decolorizing operation. Though granular activated carbon presents no dusting problem, many of the above-listed advantages may still be achieved by using the granular activated carbon as a carrier for dry cleaning detergent such as improved carbon dispersibility and more convenient handling and measuring of the detergent.

In treating dry cleaning solutions, mixtures of activated carbon with a filter aid powder and/or a sweetener powder may also be used to add detergent to the used detergent-solvent solution and to concurrently treat the solution. The filter aid powder and/or sweetener powder may be granulated separately and then mixed with granulated activated carbon, or the filter aid powder and/or sweetener powder may be blended with activated carbon powder and then the blended powders may be granulated. Any of the conventional filter aid powders may be used in the compositions of this invention, e.g. diatomaceous earths, such as the materials sold commercially under the trademarks Hyflo and Dicalite, and paper pulps. Any of the conventional sweetener powders, which chemically neutralize the fatty acids put into the dry cleaning solution by the dirty clothes, may also be used in the compositions of this invention, e.g. synthetic silicates sold under the trademarks Hysweet and Magnesol.

In the preparation of granulated activated carbon for the purpose of reconditioning used dry cleaning solutions, any dry cleaning detergent, including cationic, nonionic and anionic detergents, which is a liquid may be used as a temporary binder for activated carbon. Examples of dry cleaning detergents which may be used as temporary binders are petroleum sulfonates and amine salts of alkaryl sulfonic acids, such as methylamine salt of dodecyl benzene sulfonic acid, ethylamine salt of dodecyl benzene sulfonic acid and isopropylamine salt of dodecyl benzene sulfonic acid. As used throughout this specification, the term "petroleum sulfonate" designates a type of surface active agent consisting of a chemically complex mixture containing sulfonic acid or sulfuric ester radicals which are obtained by the direct action of a strong sulfonating agent on a suitable petroleum stock, such as white oils, deodorized kerosenes or lubricating stocks. More specifically, the petroleum sulfonates used in accordance with the present invention are of the hydrocarbon-soluble type frequently referred to as the "mahogany soaps." A typical example of the components of the complex chemical mixture is the sodium salt of sulfonated oleic acid naphthalene condensation product. A wide variety of salts of alkyl aryl sulfonic acids suitable for use as dry cleaning detergents in accordance with this invention are described in U.S. Patent 2,388,962, issued Nov. 13, 1945, to Lawrence H. Flett. Examples of other suitable dry cleaning detergents are quaternary ammonium compounds such as the diethyl sulfate quaternary of 1 - hydroxyethyl - 2 - heptadecenyl imidazoline, long-chain alkyl phenol or alkyl benzene sulfonates, sulfated fatty alcohols, alkyl sulfoacetates, alkyl sulfosuccinates, sulfated oleic or ricinoleic esters, cetyl pyridinium bromide and other cationic surfactants, esters of long-chain fatty acids with a low molecular weight hydroxycarboxylic acid, and nonionic surfactants. Other detergents such as sorbitan monooleate (sold commercially under the trademark Span 80), polyoxyethylene nonyl phenols and polyoxyethylene fatty amines may also be used as temporary binders. Blends of two or more detergents, provided that the blend is liquid, are also useful as temporary binders.

The term "detergent" as used throughout this specification designates a class of surface active agents which are compatible with hydrocarbon solvents derived from petroleum type solvents, such as Stoddard Solvent or synthetic type solvents, such as perchlorethylene. Such detergents may be either concentrated or dilute and the diluents may include dry cleaning solvents or water. Moreover the term "detergent" includes solutions of solid surface active agents in water or organic solvents.

It has been found that the formation of large, well-defined granules is easier when viscous liquids are used as temporary binders. Therefore, it is preferred to use dry cleaning detergents which are viscous liquids in preparing the granulated carbon compositions. In addition to preparing better granulated carbon compositions, the use of more viscous detergents has the advantage of overcoming the problem of difficult to handle viscous liquid detergents.

When it is desired to maintain the detergent concentration in a dry cleaning detergent-solvent solution within a specific maximum concentration and the release of the detergent required as a binder for granulating the activated carbon would exceed the maximum detergent concentration, the liquid detergent binder may be diluted with other liquids which are compatible with the system such as dry cleaning solvents, e.g. petroleum solvents (naphthas), perchlorethylene and other synthetic halogenated hydrocarbon solvents. In the event the addition of detergent is unnecessary, one may use dry cleaning solvent or some other compatible liquid alone to granulate the activated carbon. If one desires to use a detergent binder for the activated carbon, either a compounded detergent or just the active ingredient of the detergent may be used. The only requirement is that the temporary binder be liquid, and preferably a viscous liquid.

It is generally preferred to use an amount of temporary liquid binder sufficient to render the granulated activated carbon compositions substantially dust-free, and a particularly preferred product is substantially dust-free and free-flowing. The amount of binder required depends on the physical properties of the powder composition being granulated, such as porosity and moisture content, the physical properties of the liquid binder, e.g. viscosity, the method of granulation and the degree of stickiness or dustiness allowed in the finished product. The greater the mechanical action used in granulating the powder, the less liquid binder will be required, for the particles will be pushed closer together.

In general, if temporary binder is used in amounts less than about 25 percent of the tamped volume of the activated carbon powder composition, the formation of dust during the handling of the granulated powder may occur. Though greater amounts of temporary liquid binder may be used, because of the binders' function in the system to be treated with the granulated activated carbon composition, generally if more than about 70 percent of liquid binder per tamped volume of powder is used the resulting product may be stickier than desired and probably will not be as free-flowing as desired. Therefore, though the best amount of liquid binder per tamped volume of powder will vary depending upon the nature of the binder and the powder composition, the moisture content of the powder composition, and upon the particular granulation method used, a substantially dust-free granulated activated carbon composition can be prepared by using an amount of liquid binder per tamped volume of powder falling somewhere within the range of from about 25 to about 70 percent.

As used in this specification, the term "tamped volume of powder" means the specific volume of any given powder composition which has been tamped, i.e. compressed by a succession of light to medium force blows, to approximately its minimum specific volume.

In those instances when a non-dusting type of activated carbon, e.g., granular carbon, is used as a carrier for a liquid to be incorporated in a solution to be treated with the activated carbon, rendering the carbon dust-free is not a criteria for determining how much liquid to combine with the carbon. In general, the carbon may be combined with that amount of liquid which it is desired to add to the solution, though it is usually preferred not to use so much liquid that the carbon becomes wet and sticky. When adding detergent to a spent dry cleaning solution, the amount of detergent combined with the carbon is preferably sufficient to replace that which is lost in the dry cleaning process. In general, it is necessary to combine the activated carbon with detergent amounting to at least about 7.5 percent by weight of carbon in order to replace the detergent lost in the dry cleaning process. The maximum amount of liquid which may be added to granular carbon and still have a dry granular product is that amount which can be contained in the internal pore volume of the particular granular carbon.

As previously noted, the physical properties of the powder composition which is to be granulated affects the amount of liquid binder necessary to produce a substantially dust-free product. Thus the granulation of activated carbon powder alone requires more liquid binder than when the activated carbon is mixed with a filter aid powder and/or a sweetener powder because activated carbon powder is more porous than filter aids or sweeteners.

Granulation methods are well-known in the art. Methods for granulating materials are numerous and so varied that anyone desiring to granulate activated carbon powder compositions in accordance with this invention has a wide selection of granulation methods. On a laboratory scale, a Ro-Tap machine or a Waring Blendor may be used to do the granulating, and on a commercial scale, a Patterson-Kelley liquid-solids blender may be used.

As used herein, the term "granulating" (and "granulated") means the contacting of a powder with a liquid to form discrete particles of agglomeration. These particles may have many different shapes and sizes, and it is within the scope of this invention to shape the powder-liquid binder mixture such as by tableting, extruding and pelletizing either during the granulation process or after the granules have been formed.

As previously indicated, the particularly preferred form of the granulated activated carbon composition is substantially dust-free, free-flowing granules because of the ease of handling and measuring such a product.

Activated carbon compositions containing a liquid having a concurrent function in the solution being treated with activated carbon, in accordance with this invention, may be used in processes other than reconditioning dry cleaning solutions. For example, activated carbon plus wetting agents and/or brighteners may be used in treating electroplating solutions. The volume of wetting agents and/or brighteners used as liquid binders is generally the same as in the dry cleaning detergent activated carbon compositions but may vary depending upon the viscosity of the wetting agents and brighteners. Typical wetting agents which may be used as temporary binders are the aromatic sulfonic acids and their derivatives such as alkyl naphthalene sulfonates. Examples of brighteners which may be used to granulate activated carbon for use in reconditioning electroplating solutions are furfural, sulfonic acids, sulfonamides, aldehydes, phenols, naphthols, and a variety of other chemicals. Wetting agents and brighteners which are solids may also be used by dispersing or dissolving them in solution which is then used as a binder.

The following are specific examples of activated carbon compositions granulated in accordance with this invention. These examples are merely illustrative of the compositions falling within the scope of this invention. Other specific examples will readily occur to those skilled in the art in view of the teachings and principles disclosed herein.

*Example 1*

An activated carbon, sold under the trademark Premium Darco, having a density of about 0.45 gm./ml. was placed in a blender and a liquid dry cleaning detergent, isopropylamine salt of dodecyl benzene sulfonic acid, having a density of about 0.98 gm./ml. was added to the activated carbon. Granulation was carried out by adding about 110 parts by weight of liquid detergent to about 100 parts by weight of the activated carbon. These ingredients were blended in a laboratory Ro-Tap which produced granulated activated carbon in the form of fairly large granules. The granulated activated carbon was substantially dust-free and free-flowing, and it wetted instantly when added to a dry cleaning solvent solution.

Reconditioning tests on used dry cleaning solution (perchlorethylene-isopropylamine salt of dodecyl benzene sulfonic acid) were carried out using the activated carbon granulated with the isopropylamine salt of dodecyl benzene sulfonic acid.

Tests on the release of the temporary binder detergent to the solvent showed that essentially 100% of the detergent was released to the solvent within 1.5 hours.

When 1.01 grams of the granulated activated carbon was added to 100 grams of impure perchlorethylene, the soluble impurities were adsorbed by the activated carbon, and the resulting color level of the reconditioned perchlorethylene was greatly improved and substantially equivalent to the color level obtained using powdered, nongranulated activated carbon.

*Examples II–XXI*

In these examples, various granulated activated carbon compositions for use in dry cleaning solution purification were prepared. The procedure used for granulation was as follows:

About 50 grams of powder composition was placed in an evaporating dish (5 inches in diameter x 2.5 inches high), and liquid binder was slowly added while the mixture was being stirred with a glass stirring rod. When sufficient binder had been added so that 70–90% of the powder was a solid mass, the contents of the evaporating dish were emptied into a Waring Blendor and were blended at high speed (about 10,000 r.p.m.) for about five minutes. If too much binder had been added to the powder, a solid cake would accumulate on the corners of the blending jar. In this case, the material would be scraped away from the walls and more powder would be added. When a granulated mixture was formed which appeared to be substantially dust-free and reasonably free-flowing, the amount of binder required per 100 mls. of powder was calculated.

Three of the granulations, which will be indicated, were performed by forcing the activated carbon composition-liquid binder mixture through Ro-Tap screens. This was a satisfactory method but was no more efficient than the Waring Blendor method.

The following materials were used:

| Symbol | Trademark | Material |
|---|---|---|
| A | Premium Darco | Activated carbon prep. from lignite. |
| B | Charkote | Activated carbon prep. from black ash. |
| C | Superkarb | Activated carbon prep. from coconut shells. |
| D | Hyflo | Diatomaceous earth filter aid. |
| E | Hysweet | Synthetic silicate sweetener. |
| F | | Isopropylamine salt of dodecyl benzene sulfonic acid. |
| G | Petronate L | Petroleum sulfonate. |
| H | | Sodium hexadecyl sulfate. |
| I | | 1-hydroxyethyl-2-heptadecenyl imidazoline. |
| J | | 93–93.5% polyoxyethylene (20) Armeen TD* 3% ethylene glycol 3.5–4% water. |
| K | | Diethyl sulfate quaternary of 1-hydroxy-ethyl-2-heptadecenyl imidazoline. |
| L | | 50% sorbitan monooleate, 50% polyoxyethylene (10) fractionated tall oil rosin acids. |
| M | Span 80 | Sorbitan monooleate. |
| N | | Stoddard solvent. |

*Armeen TD is the trademark of a fatty amine mixture sold by Armour and Co.

The results of the test are reported in the following table:

TABLE I

| Example No. | Liquid Binder | Type of Detergent | Powder Composition | Powder Density, gms./ml. | Powder Moisture Content, wt. percent | Percent Binder Used (based on tamped vol. of powder) | Remarks |
|---|---|---|---|---|---|---|---|
| II | F | Anionic | A | 0.541 | 5.0 | 48 | Excellent dust-free granules. |
| III | G | do | A | 0.541 | 5.0 | 55 | Do. |
| IV | H | do | A | 0.541 | 5.0 | 48 | Dust-free powder. |
| V | I | Cationic | A | 0.541 | 5.0 | 39 | Slightly dusty powder. |
| VI | J | do | A | 0.541 | 5.0 | 51 | Do. |
| VII | K | do | A | 0.541 | 5.0 | 41 | Do. |
| VIII | L | Non-ionic | A | 0.541 | 5.0 | 44 | Do. |
| IX | M | do | A | 0.541 | 5.0 | 43 | Do. |
| X* | N & F | | A | 0.541 | 5.0 | 73 | Moderately sticky. |
| XI* | N | | A | 0.541 | 5.0 | 52 | Very sticky powder. |
| XII | F | Anionic | A & D | 0.482 | 3.3 | 25 | Slightly dusty powder. |
| XIII* | F & N | | A & D | 0.482 | 3.3 | 68 | Good granules but sticky. |
| XIV | F | Anionic | A & E | 0.459 | 5.8 | 42 | Slightly dusty powder. |
| XV | N | | A & E | 0.459 | 5.8 | 48 | Very sticky powder. |
| XVI | F | Anionic | A & D & E | 0.551 | 6.9 | 31 | Slightly dusty powder. |
| XVII | F & N | | A & D & E | 0.551 | 6.9 | 75 | Moderately sticky powder. |
| XVIII | N | | A & D & E | 0.551 | 6.9 | 42 | Do. |
| XIX | F | Anionic | B | 0.259 | 6.8 | 49 | Excellent. |
| XX | F | do | B | 0.326 | 22.7 | 40 | Dust-free powder. |
| XXI | F | do | C | 0.682 | 5.7 | 35 | Excellent. |

*Formed using Ro-Tap screens.

Example XXII

Liquids useful in treating electroplating solutions were also tested as temporary, liquid binders. Sodium lauryl sulfate is a solid material which is used as a wetting agent in electroplating solutions, and which is commercially available under the trademark Duponol ME. A solution containing 10 grams of sodium lauryl sulfate per 100 ml. of water was tested as a binder for activated carbon powder sold under the trademark Premium Darco. When 51.5% of this solution was added per tamped volume of the activated carbon powder, the resulting product was a slightly sticky dust-free powder. The addition of less solution would have formed a better product, one which would be less sticky.

A liquid brightener, Du Pont #1085 Coppralyte, was also tested as a liquid binder for Premium Darco activated carbon powder. 50% of this liquid brightener per tamped volume of activated carbon powder yielded a dust-free powder composition.

Example XXIII

A sample of spent perchlorethylene dry cleaning solvent from a commercial plant was treated for 20 hours (agitated) with 1% by weight of activated carbon granules containing 35% by weight of the isopropylamine salt of dodecyl benzene sulfonic acid, a dry cleaning detergent. Another sample of this solvent was treated in the same manner with 0.65% by weight of activated carbon granules and 0.35% by weight of the isopropylamine salt of dodecyl benzene sulfonic acid was added separately to the solvent. After the treatment, the solvent was filtered, the detergent concentration was measured, and the color of the solvent was determined by measuring its optical density with a Beckman B spectrophotometer using a 420 m$\mu$, 1.0 cm. light source. The results were as follows:

| Sample Treatment | Solvent Light/Absorbance (optical density units) | Detergent Concentration, Percent/vol. |
|---|---|---|
| None except filtration | 1.173 | 0.30 |
| Activated carbon granules containing 35% detergent | 0.841 | 0.82 |
| Activated carbon granules plus separate detergent addition | 0.842 | 0.81 |

These results indicate that the treatment of a spent dry cleaning solvent with granular activated carbon impregnated with a dry cleaning detergent is as effective as solvent reconditioning (solvent color reduction and increased detergent concentration) as adding activated carbon and detergent separately.

Broadly, in accordance with the present invention, the minimum amount of dry cleaning detergent required to produce a dust-free powdered activated carbon is about 40 percent by volume based upon the available pore volume of the activated carbon powder used, while the maximum amount of dry cleaning detergent which may be used to produce a free-flowing granulated activated carbon composition is about 105 percent by volume based upon the available pore volume of the carbon. Since activated carbon powder ordinarily contains moisture, the term "available pore volume" is used to denote the total pore volume less the pore volume occupied by moisture present in the carbon. In general, it has been found that the amount of detergent required to produce a satisfactory dust-free, free-flowing granulated carbon powder composition lies with the range of about 26% by weight to about 67% by weight of the granulated carbon powder composition, depending upon the particular activated powdered carbon used.

The following examples are illustrative:

*Example XXIV*

To about 1½ grams of the isopropyl amine salt of dodecyl benzene sulfonic acid previously weighed into an evaporating dish, were added 2 grams of an activated carbon powder having a moisture content of 3.7%, a tamped apparent bulk density [1] of 0.605 gm./ml. and an available interior pore volume of 0.71 ml./gm.[2] The detergent and carbon were thoroughly mixed and thereafter activated carbon powder was added to the mixture in approximately 0.1 gram increments with mixing until a substantially dust-free activated carbon powder composition was obtained containing about 35% by weight of the amine salt based upon the weight of the powdered carbon. The quantity of detergent present in the composition was determined to be about 21% by volume based upon the tamped volume of the carbon powder and about 47% by volume based upon the available pore volume of the carbon present.

To the resulting composition, approximately ½ gram additional detergent (isopropylamine salt of dodecyl benzene sulfonic acid) was added with mixing followed by the addition of further 0.2 gram increments of detergent until a granulated activated carbon powder composition was obtained containing about 74% by weight of the amine salt based upon the weight of the powdered carbon used. The quantity of detergent present was determined to be about 44% by volume based upon the tamped volume of the carbon powder and about 102% by volume based upon the available pore volume of the carbon present.

*Example XXV*

To about one gram of the isopropyl amine salt of dodecyl benzene sulfonic acid previously weighed into an evaporating dish, were added 2 grams of an activated carbon powder having a moisture content of 3.8%, a tamped apparent bulk density [1] of 0.528 gm./ml. and an available interior pore volume of 0.94 ml./gm.[2] The detergent and carbon were thoroughly mixed and thereafter activated carbon powder was added to the mixture in approximately 0.1 gram increments with mixing until a substantially dust-free activated carbon powder composition was obtained containing about 47% by weight of the amine salt based upon the weight of the powdered carbon. The quantity of detergent present in the composition was determined to be about 24% by volume based upon the tamped volume of the carbon powder and about 48% by volume based upon the available pore volume of the carbon present.

To the resulting composition, approximately ½ gram additional detergent (isopropylamine salt of dodecyl benzene sulfonic acid) was added with mixing followed by the addition of further 0.2 gram increments of detergent until a granulated activated carbon powder composition was obtained containing about 97% by weight of the amine salt based upon the weight of the powdered carbon used. The quantity of detergent present was determined to be about 50% by volume based upon the tamped volume of the carbon powder and about 100% by volume based upon the available pore volume of the carbon present.

*Example XXVI*

To about 1.25 grams of the isopropyl amine salt of dodecyl benzene sulfonic acid previously weighed into an evaporating dish, were added 2 grams of an activated carbon powder having a moisture content of 4.4%, a tamped apparent bulk density [1] of 0.442 gm./ml. and an available interior pore volume of 1.31 ml./gm.[2] The detergent and carbon were thoroughly mixed and thereafter activated carbon powder was added to the mixture in approximately 0.1 gram increments with mixing until a substantially dust-free activated carbon powder composition was obtained containing about 58% by weight of the amine salt based upon the weight of the powdered carbon. The quantity of detergent present in the composition was determined to be about 25% by volume based upon the tamped volume of the carbon powder and about 43% by volume based upon the available pore volume of the carbon present.

To the resulting composition, approximately ½ gram additional detergent (isopropylamine salt of dodecyl benzene sulfonic acid) was added with mixing followed by the addition of further 0.2 gram increments of detergent until a granulated activated carbon powder composition was obtained containing about 140% by weight of the amine salt based upon the weight of the powdered carbon used. The quantity of detergent present was determined to be about 60% by volume based upon the tamped volume of the carbon powder and about 104% by volume based upon the available pore volume of the carbon present.

*Example XXVII*

To about 1½ grams of the isopropyl amine salt of dodecyl benzene sulfonic acid previously weighed into an evaporating dish, were added 2 grams of an activated carbon powder having a moisture content of 22.3% and a tamped apparent bulk density [1] of 0.369 gm./ml. The detergent and carbon were thoroughly mixed and thereafter activated carbon powder was added to the mixture in approximately 0.1 gram increments with mixing until a substantially dust-free activated carbon powder composition was obtained containing about 80% by weight of the amine salt based upon the weight of the powdered carbon. The quantity of detergent present in the composition was determined to be about 28% by volume based upon the tamped volume of the carbon powder.

To the resulting composition, approximately ½ gram additional detergent (isopropylamine salt of dodecyl benzene sulfonic acid) was added with mixing followed by the addition of further 0.2 gram increments of detergent until a granulated activated carbon powder composition was obtained containing about 202% by weight of the amine salt based upon the weight of the powdered carbon used. The quantity of detergent present was determined to be about 72% by volume based upon the tamped volume of the carbon powder.

In view of the above description and examples, it is evident that granulated activated carbon compositions made in accordance with this invention are substantially dust-free, are easily dispersed in process solutions to be treated with carbon, are substantially as effective as adsorbents as the activated carbon from which they are made, may contain a high proportion of temporary binder, and they have the additional advantage that the temporary binder has utility in the solution being treated with the activated carbon.

What is claimed is:

1. A composition of matter consisting essentially of an activated carbon powder granulated with a temporary surface active liquid binder, selected from the group consisting of anionic, cationic and nonionic detergents the volume of liquid binder present in said composition being within the range of 40 percent to 105 percent of the available pore volume.

2. A composition of matter according to claim 1 wherein said liquid binder is a dry cleaning detergent.

3. A composition of matter according to claim 2 wherein said detergent is a petroleum sulfonate.

---

[1] Tamped apparent bulk density is that obtained by placing a given weight of powder in a glass cylinder and tapping the bottom on a surface repeatedly until there is no further settling.

[2] Pore volume (corrected for moisture) was measured by mercury displacement using granular carbon which was crushed to give the powdered carbon used.

4. A composition of matter according to claim 2 wherein said detergent is an amine salt of an alkyl aryl sulfonic acid.

5. A composition of matter comprising an activated carbon powder which is granulated with a temporary surface active liquid binder selected from the group consisting of liquid dry cleaning detergents and dry cleaning solvents, with the temporary, liquid binder amounting to from about 25 to about 70 percent per tamped volume of solids.

6. A composition of matter which consists essentially of activated carbon granules impregnated with at least about 7.5% by weight of a liquid dry cleaning detergent, provided that the carbon granules contain no more liquid detergent than can be contained in the internal pore volume of the granular carbon so as to maintain the carbon in a dry form.

7. The method of reconditioning spent dry cleaning solution which comprises adding to the spent dry cleaning solution an activated carbon powder granulated with a temporary surface active liquid binder, selected from the group consisting of anionic, cationic and nonionic detergents the volume of said liquid binder present in said composition being within the range of 40 percent to 105 percent of the available pore volume.

8. The method of reconditioning spent dry cleaning solutions which comprises adding to the spent dry cleaning solution activated carbon granules impregnated with at least about 7.5% by weight of a liquid dry cleaning detergent.

References Cited
UNITED STATES PATENTS

| | | | |
|---|---|---|---|
| 1,704,604 | 3/1929 | Hatfield | 252—89 |
| 1,917,096 | 7/1933 | Chamberlin | 252—89 |
| 2,053,007 | 9/1936 | Parkhurst | 252—89 |
| 2,315,410 | 3/1943 | FitzSimons et al. | 252—163 XR |
| 2,388,962 | 11/1945 | Flett | 252—89 |
| 2,491,051 | 12/1949 | McCarter | 252—89 |
| 3,124,529 | 3/1964 | Smit | 210—39 |

LEON D. ROSDOL, *Primary Examiner.*

ALBERT T. MEYERS, *Examiner.*

W. E. SCHULZ, *Assistant Examiner.*